(12) United States Patent  
Zimmerman et al.

(10) Patent No.: US 7,961,117 B1  
(45) Date of Patent: Jun. 14, 2011

(54) SYSTEM, MODULE, AND METHOD FOR CREATING A VARIABLE FOV IMAGE PRESENTED ON A HUD COMBINER UNIT

(75) Inventors: Kenneth A. Zimmerman, Lake Oswego, OR (US); Gary J. Albert, Tualatin, OR (US); Robert A. Armstrong, Canby, OR (US); Lance D. Walker, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 402 days.

(21) Appl. No.: 12/283,880

(22) Filed: Sep. 16, 2008

(51) Int. Cl.  
*G01C 21/00* (2006.01)

(52) U.S. Cl. ........ 340/980; 340/974; 340/973; 340/977; 345/7; 701/14

(58) Field of Classification Search .................. 340/980, 340/974, 975, 973, 972, 961, 977; 345/7–9; 701/4, 14; 348/115, 121; 434/30  
See application file for complete search history.

(56) References Cited

U.S. PATENT DOCUMENTS

| 6,567,014 B1 * | 5/2003 | Hansen et al. ............... 340/980 |
| 2003/0076280 A1 * | 4/2003 | Turner et al. .................. 345/7 |

* cited by examiner

*Primary Examiner* — Anh V La  
(74) *Attorney, Agent, or Firm* — Matthew J. Evans; Daniel M. Barbieri

(57) ABSTRACT

The embodiments disclosed herein present novel and non-trivial system, module, and method for creating a variable FOV image presented on a HUD combiner unit. A processor receives navigation system data and data associated with eye position. A variable FOV image data set representative of navigation symbology is generated, where the image data set is determined by applying the navigation system and eye position data to an adaptive FOV function, where the function correlates eye position to an FOV image. The image data set is presented to a HUD system where an image represented in the image data set is displayed on a combiner unit, whereby the image FOV correlates to eye position. Furthermore, the processor may receive terrain data and generate a variable FOV image data set inclusive of data representative of a three-dimensional perspective scene outside an aircraft.

21 Claims, 8 Drawing Sheets

Example of Overhead Installation

Example of Glareshield Installation

US 7,961,117 B1

SYSTEM, MODULE, AND METHOD FOR CREATING A VARIABLE FOV IMAGE PRESENTED ON A HUD COMBINER UNIT

BACKGROUND OF THE INVENTION

1. Field of the Invention

This invention pertains to the field of Head-Up Displays (singularly, "HUD") that provide images in the field of view of a person viewing the scene outside of a vehicle such as an aircraft or automobile.

2. Description of the Related Art

A HUD is typically any transparent display that presents an image without obstructing the viewer's view or requiring the viewer to look away from the scene outside of a vehicle such as an aircraft or automobile while flying or driving. Initially developed for use in military aircraft, HUDs are used in commercial and private aircraft, automobiles, and other applications. HUD systems may be comprised of a plurality of components including, but not limited to, an image projection unit and a partially transparent and reflective optic commonly referred to as a combiner.

Generally, the field of view ("FOV") of a HUD may be dependent on an Eye Reference Position ("ERP"). HUD performance characteristics such as required FOV may be measured from an ERP from where a HUD could be designed from optimal viewing. This position may serve as a reference point from which the viewer could enjoy optimal viewing. The size or fixed area of a HUD combiner unit on which the image is projected could determine a required FOV. A HUD combiner unit may be designed so that the image falls within the area of the combiner unit for the required FOV by a viewer from the ERP.

Since a combiner unit has a fixed area and the image display area may be conformal to the outside scene, images of symbology and terrain appear to expand when a viewer moves his or her eye position aft of the ERP and appear to contract when a viewer moves his or her eye position forward of the ERP. In effect, the movement of the viewer's eye position from the ERP changes the FOV available on the HUD combiner unit, but the image FOV projected on the combiner unit remains fixed and does not vary.

BRIEF SUMMARY OF THE INVENTION

The embodiments disclosed herein present novel and non-trivial system, module, and method for creating a variable FOV image presented on a HUD combiner unit. An FOV image which varies could allow for more information to be presented on a combiner unit when a viewer's eye position moves forward of an ERP or closer to the combiner unit which, in effect, caused the FOV to increase. If a viewer's eye position moves aft of an ERP or further away from a combiner unit, an FOV image which varies could allow for the same information to be presented by adapting an image conformity commensurate to the movement because such movement, in effect, has caused the FOV to decrease.

In one embodiment, a system is disclosed for creating a variable FOV image presented on a HUD combiner unit. The system comprises a navigation system data source, data associated with eye position source, a processor, and a HUD system. A variable FOV image data set could be generated by a processor applying navigation system data source and data associated with eye position to an adaptive FOV function to produce an FOV correlated to eye position, wherein the image data set is representative of navigation symbology. The image data set could be provided to the HUD system so that an FOV image is presented on a combiner unit. In an alternative embodiment, the system includes a terrain data source, and the generation of the image data set includes data representative of a three-dimensional perspective scene outside the aircraft.

In another embodiment, a module is disclosed for creating a variable FOV image presented on a HUD combiner unit. The module includes a processor from which a variable FOV image data set could be generated and provided to the HUD system as discussed above. The module includes input and output communications interfaces to facilitate the receiving and providing of data, respectively. In an alternative embodiment, the generated image data set includes data representative of a three-dimensional perspective scene outside the aircraft.

In another embodiment, a method is disclosed for creating a variable FOV image presented on a HUD combiner unit. The method receiving navigation systems data and data associated with eye position, generating a variable FOV image data set as discussed above, and providing the image data set to the HUD system. In an alternative embodiment, the method receives terrain data, and the generated image data set includes data representative of a three-dimensional perspective scene outside the aircraft

The drawings of FIG. 4 illustrate a correlation between eye position and FOV.

The drawings of FIG. 5 illustrate HUD images attributable to a conformal image of symbology.

The drawings of FIG. 6 illustrate HUD images that could result with the benefit of using a motion tracking system.

Figure 7:
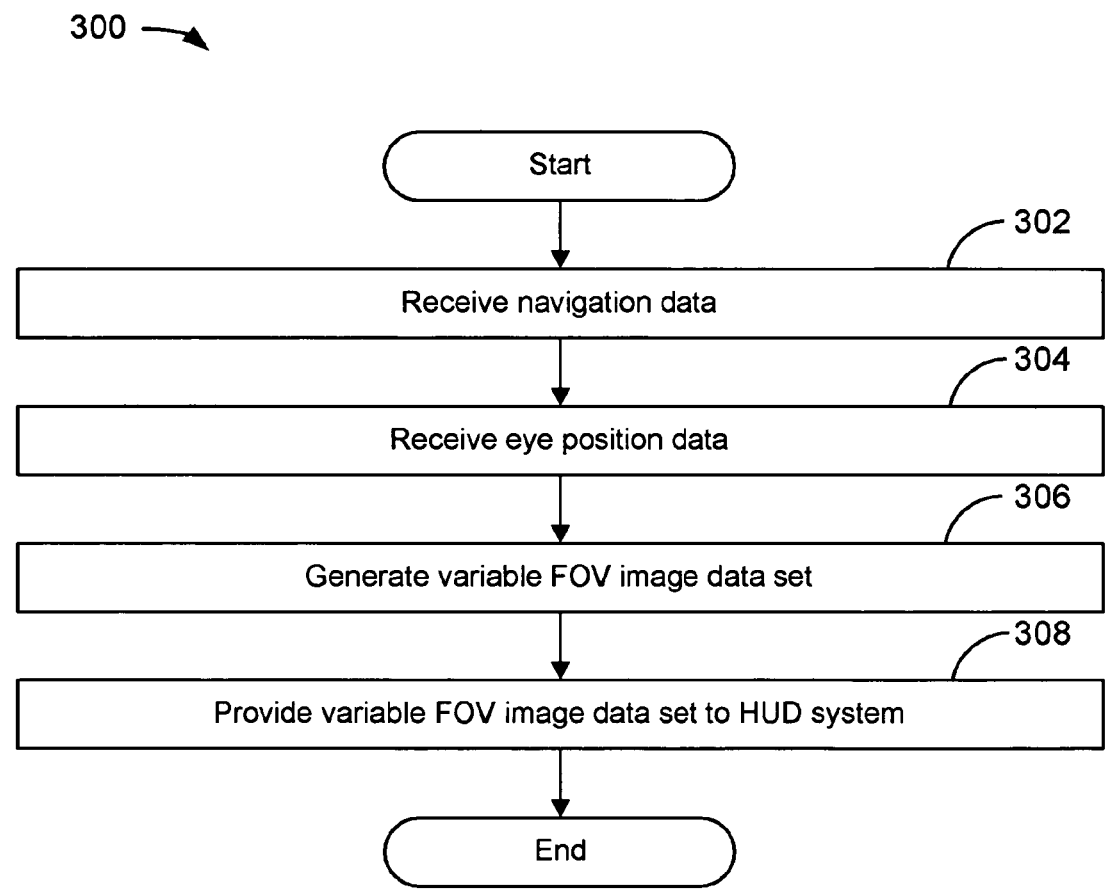

FIG. 7 depicts a flowchart for creating a variable FOV image presented on a HUD combiner unit.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
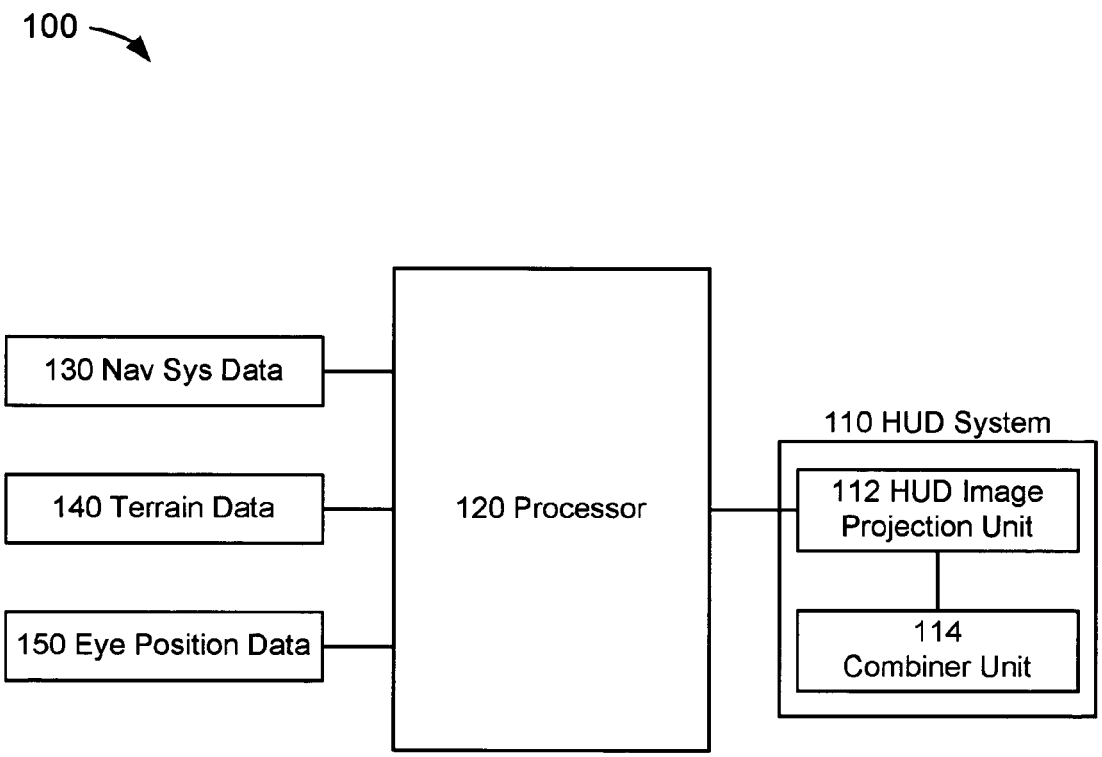
FIG. 1 depicts a block diagram of a system for creating a variable FOV image presented on a HUD combiner unit.

FIG. 1 depicts a block diagram of a variable field of view ("FOV") head-up display ("HUD") creation system 100 suitable for implementation of the techniques described herein. The variable FOV creating system 100 of an embodiment of FIG. 1 includes a HUD system 110, processor 120, navigation systems input 130, terrain data 140, and data associated with eye position 150.

A HUD system 110 may be employed in an aircraft. Although the embodiments herein are drawn to an aircraft HUD installation, the embodiments herein should not be considered as limited to the field of aviation. As embodied herein, the embodiments disclosed herein may apply to any field in which a person may monitor or view the scene outside of the vehicle but needs to monitor or view information normally requiring the viewer to take his or her vision away from the scene outside of the vehicle. Examples of situations where the viewer may act in such a manner include, but are not limited to, the fields of aviation and automobiles.

As embodied in FIG. 1, a HUD system 110 may be comprised of a plurality of components including, but not limited to, a HUD image projection unit 112 and a partially transparent and reflective optic commonly referred to as a combiner unit 114. In general, a HUD uses a combination of lenses to create a collimated image. Lens designs that achieve the necessary optical performance tend to be complex and expensive, especially when the FOV is high and the diameter of the lens is large.

Figure 2A:
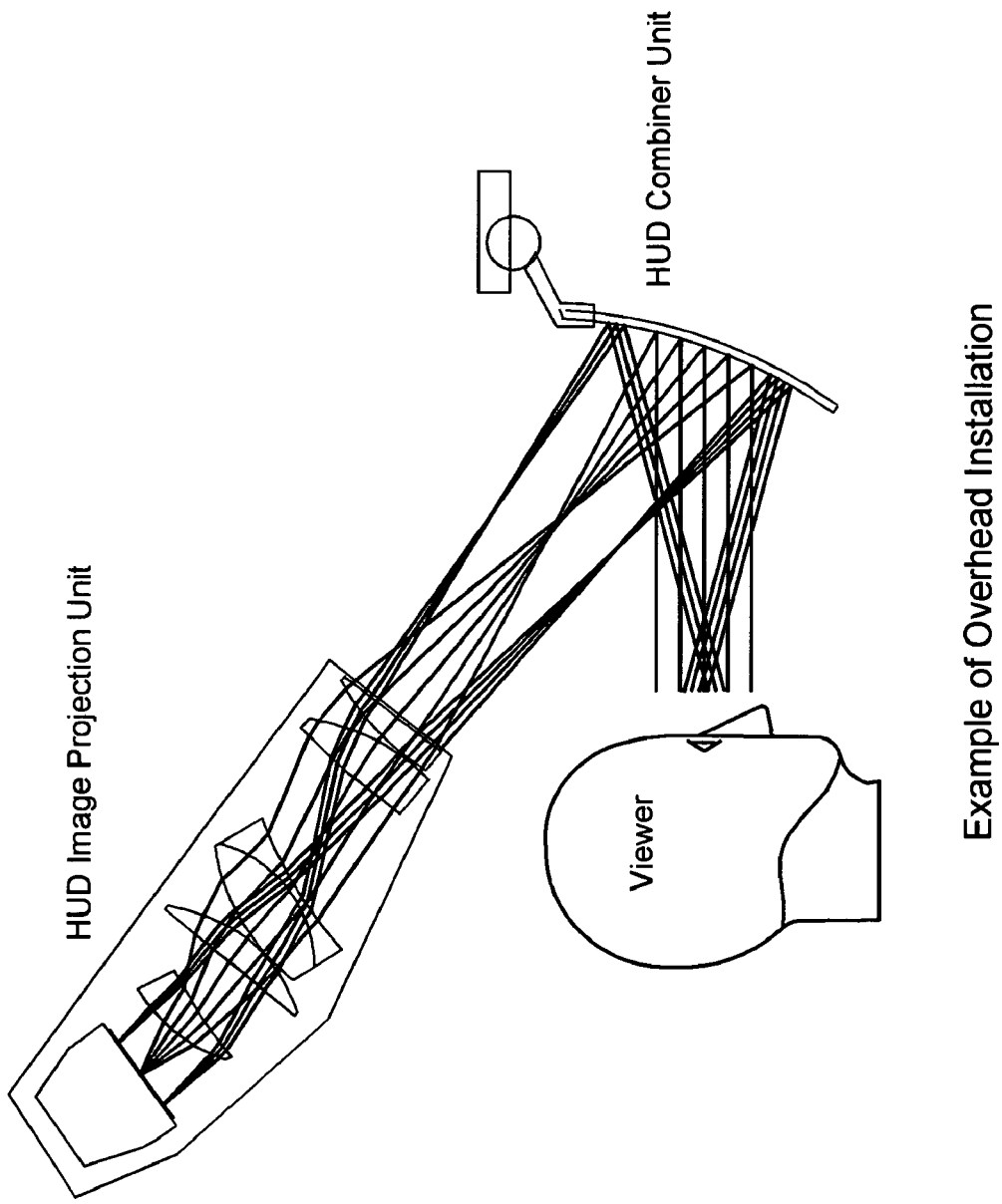
FIG. 2A depicts an example of a typical wide field of view HUD such as found in a commercial aircraft.
Figure 2B:
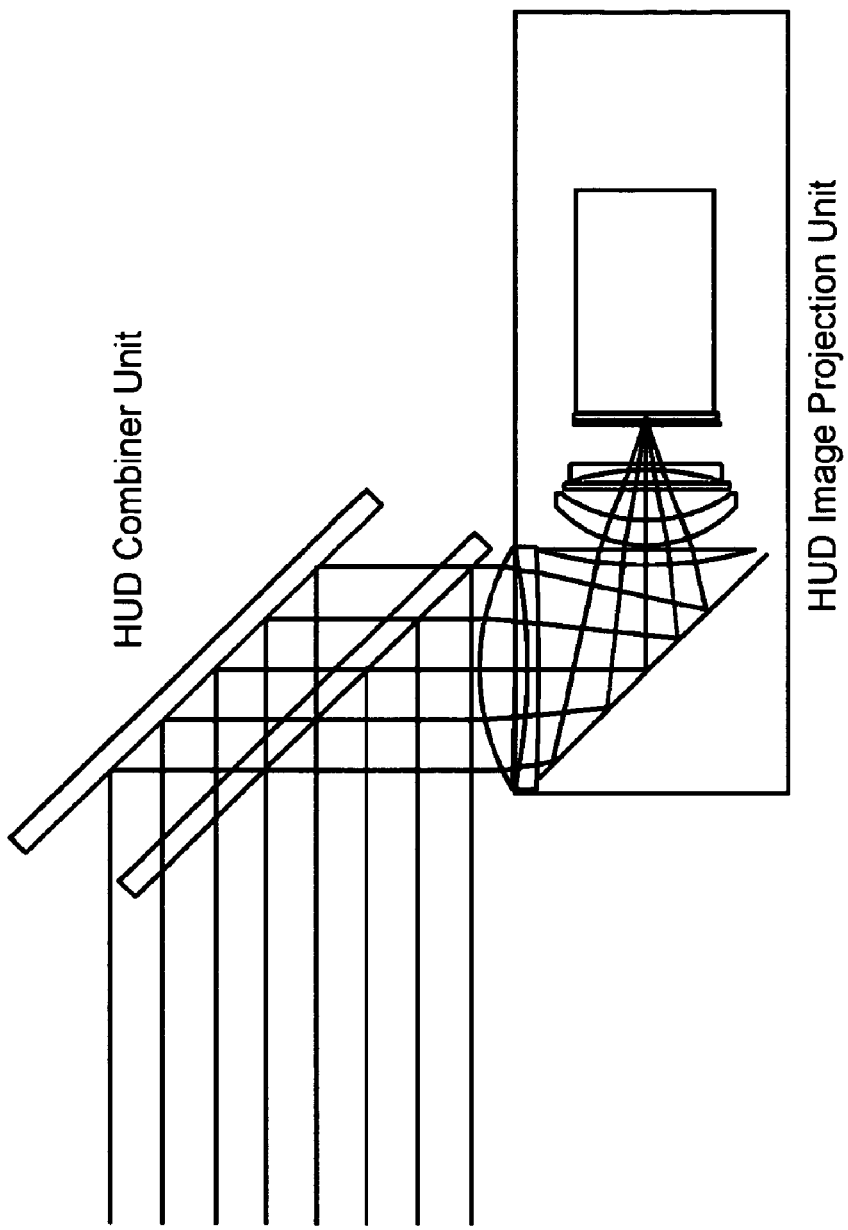
FIG. 2B depicts an example of a typical glareshield mounted HUD such as found in a fighter aircraft.
Figure 2B:
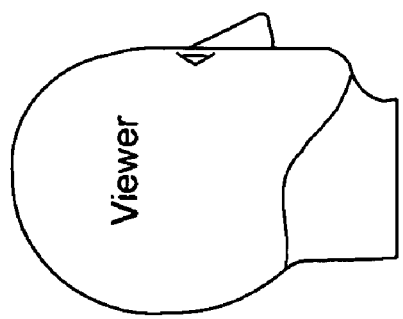

For the purpose of illustration and not for the purpose of limitation, FIGS. 2A and 2B provide a mere two examples of HUD configurations from the many configurations known to those skilled in the art. For example, FIG. 2A shows an optical layout of a HUD with a wide FOV, which consists of an image projection unit that employs a relay lens assembly mounted over the viewer's head and a combiner unit located forward of the viewer that may be mounted in an aircraft such as a commercial aircraft. As shown, the relay lens assembly is used to form an intermediate image one focal length away from a transparent combiner, which, in turn, functions as a collimating mirror forming collimated beams of light. In another example, FIG. 2B shows a HUD assembly comprised of a HUD image projection unit and combiner unit that may be mounted in the glareshield of an aircraft such as a military fighter aircraft. As shown, beams of light leave a group of field flattening lenses, strike a reflecting mirror or prism, and pass through convex and concave lenses to form collimated beams of light. As shown in the examples of FIGS. 2A and 2B, a typical HUD image projection unit 112 comprises of a complex array of lenses, prisms, and/or mirrors. As embodied herein, a HUD system 110 could comprise any HUD image projection unit 112 which receives optical image input and projects the image onto a combiner unit 114 comprising of one or more combiners.

A combiner unit 114 may be used as a display device used in a HUD system 110. A combiner unit 114 may comprise of one surface as shown in FIG. 2A or a plurality of surfaces as shown in FIG. 2B. A combiner could comprise a transparent, semi-reflective surface where such surface permits the viewer to view the outside real-world scene while simultaneously viewing information contained in an image reflected toward the viewer by one or more combiners. As a display device, a combiner unit 114 may present tactical flight information. As embodied herein, tactical flight information displayed on a combiner unit 114 could be information relevant to the instant or immediate control of the aircraft, whether the aircraft is in flight or on the ground.

Figure 3A:
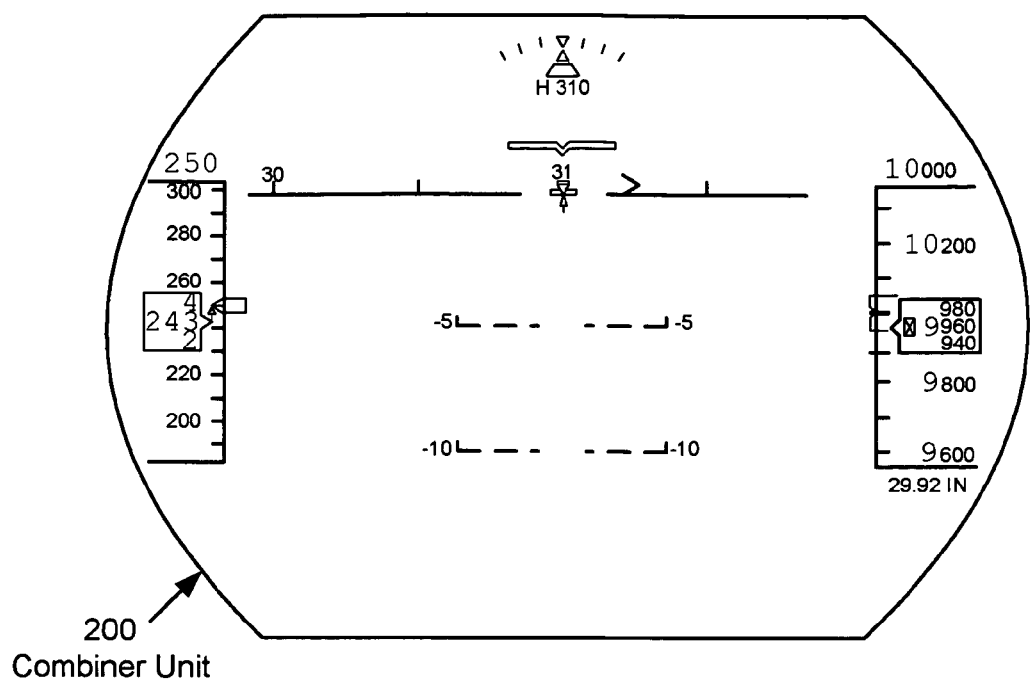
FIG. 3A depicts an exemplary illustration of a display of symbology of basic T information on a combiner unit.

A combiner unit 114 could display symbology representative of the same information found on a primary flight display ("PFD"), such as "basic T" information (i.e., speed, pitch and roll attitude, altitude, and heading). Also, a combiner unit 114 could display an image of terrain conformal to the scene outside the aircraft. FIG. 3A provides an exemplary illustration of a display of symbology of basic T information on a combiner unit 200.

Figure 3B:
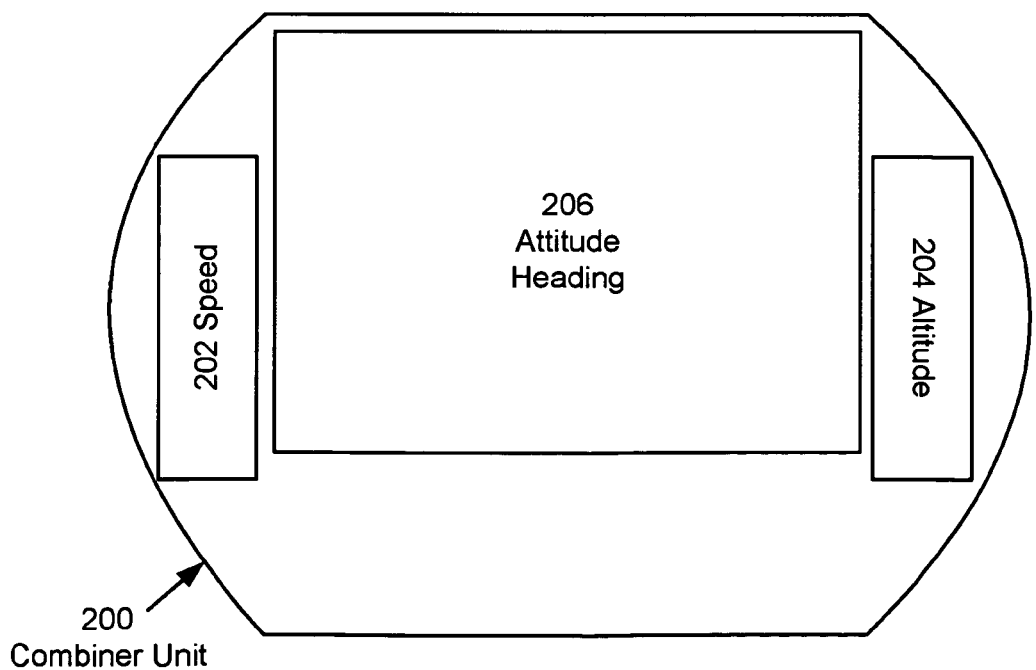
FIG. 3B depicts a map of areas of the symbology displayed in FIG. 3A.

A combiner unit may be designed so images lie within a defined area. FIG. 3B provides a map of areas of speed 202, altitude 204, and attitude/heading 206 corresponding to the symbology shown on combiner unit 200 of FIG. 3A. The disclosed embodiments herein apply to the a plurality of indications or information that may be displayed as symbology including, but not limited to, speeds, altitudes, pitch attitude, roll attitude, magnetic heading, magnetic track, altitude barometric correction setting, vertical speed displays, flight path angle and drift angles, flight director commands, limiting and operational speeds, mach number, radio altitude and decision height, final approach trajectory deviations, and marker indications. Those skilled in the art understand that a HUD system 110 may be designed to provide flexible configurations which may be tailored to the desired configuration specified by, for example, a manufacturer, buyer, or user of the aircraft.

Returning to FIG. 1, a processor 120 could have provided the image data received by a HUD system 110. A processor 120 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A processor 120 may be driven by the execution of software or computer instruction code containing algorithms developed for the specific functions embodied herein; alternatively, a processor 120 may be implemented as an application-specific integrated circuit (ASIC). Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing unit. As embodied herein, a processor 120 could be a processor(s) used by or in conjunction with any other system of the aircraft including, but not limited to, a processor(s) associated with a navigation system, a system used for in determining eye position, a HUD system, a terrain awareness and warning system ("TAWS"), a synthetic vision system ("SVS"), an enhanced vision system ("EVS"), a combined SVS-EVS, or any combination thereof.

As stated above, a processor 120 may provide an image data set to a HUD system 110 for the projection and display of an image on the combining unit 114, where such image data set is representative of images of symbology and/or terrain that conform to the image data area and scene outside of the aircraft. A processor 120 may be electronically coupled to systems and/or units to facilitate the providing of output data. It is not necessary that a direct connection be made; instead, such receipt of input data and the providing of output data could be provided through a data bus or through a wireless network. A processor 120 may be operatively coupled or electronically coupled to systems and/or sources to facilitate the receipt of input data; as embodied herein, operatively coupled and electronically coupled may be used interchangeably.

A processor 120 may receive input data from various systems and/or sources including, but not limited to, navigation system data 130 and terrain data 140. Navigation system data 130 comprises data representative of navigation system information that could be provided by one or more sources of navigation data information. Navigation system information may include, but is not limited to, data representative of speed, altitude, attitude (e.g., roll, pitch, and yaw), and heading. It should be noted that data, as embodied herein for any source or system including a navigation system, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

A navigation system data 130 may include, but is not limited to, an air/data system, an attitude heading reference system, an inertial guidance system (or inertial reference system), a global navigation satellite system ("GNSS") (or satellite navigation system), and a flight management computing system, all of which are known to those skilled in the art. For the purposes of the embodiments herein, a radio altimeter system may be included in the navigation system data 130; a radio altimeter system is known to those skilled in the art for determining the altitude above the surface over which the aircraft is currently operating. As embodied herein, a navigation system 130 could provide navigation data including, but not limited to, geographic position, altitude, pitch and roll attitude, speed, vertical speed, heading, and radio altitude to a processor 120 for subsequent processing as discussed herein.

Terrain data 140 comprises data representative of terrain and/or obstacles that could be provided by one or more sources. A terrain data source may include, but is not limited to, a terrain database, a non-database terrain acquisition system, or any combination thereof. A terrain database could comprise any source of terrain data, obstacle data, other manmade or natural features, geopolitical boundaries, or any combination thereof. Obstacles may include, but are not limited to, towers, buildings, poles, wires, other manmade structures, and foliage. As embodied herein, a terrain data source could include terrain data, obstacle data, or both.

A terrain database could be employed in a synthetic vision system ("SVS") to create a three-dimensional perspective of the scene in front of the aircraft on a two-dimensional display unit of an aircraft's indicating system. An SVS allows the pilot to "see" the terrain ahead in 2D even though his visibility of the actual scene may be limited or obscured by meteorological conditions such as clouds and fog. The actual scene may be determined from navigation system data 130. As discussed above, terrain could be depicted on a combiner unit 114 in a wireframe configuration. Alternatively, terrain may be depicted on a combiner unit 114 as a monochrome, three-dimensional lighted solid image based upon an image data set comprised of terrain data and color intensity data as disclosed in patent application Ser. No. 12/080,121 and which is hereby incorporated in its entirety.

A terrain data source could comprise a non-database terrain acquisition system that could provide data representative of a real-world image of the scene outside of an aircraft. Such system could include, but is not limited to, a radar-based TAWS system, an enhanced vision system, and/or a visual spectrum camera system. A terrain data source could also comprise a system which combines data from a terrain database with data acquired from a non-database terrain acquisition system.

Eye position data 150 may be input data associated with a viewer's eye position provided to a processor 120. Data associated with eye position could be obtained from many different systems. Although the following discussion will be drawn to a motion tacking system, it is provided for the purpose of illustration and not limitation. As embodied herein, any source from which eye position may be determined may be used. A motion tracking system may comprise a helmet, stereo glasses, head-mounted displays, or some article worn on the head of a viewer may be used in conjunction with one or more sensors or sensing devices installed or placed in the cockpit for capturing the movement or motion of the viewer's head. As signals or other data are captured by the sensors or sensing devices, a processor may receive such signals or data to compute data representative of a viewer's head motion. With a known initial eye position, a viewer's eye position may be determined from the motion.

A motion tracking system could have a processor integrated within it. In one embodiment, data associated with eye position provided to a processor 120 could comprise position data, where such eye position data 150 could be determined by the integrated processor and provided directly or indirectly to an appropriately programmed processor 120 for the generation of an image data set representative of the images of symbology and/or terrain that conform to the image data area and scene outside of the aircraft. In another embodiment, data associated with eye position could comprise motion tracking data, where such motion tracking data could be provided directly or indirectly to an appropriately programmed processor 120 for the generation of an image data set representative of the images of symbology and/or terrain that conform to the image data area and scene outside of the aircraft.

Figure 4A:
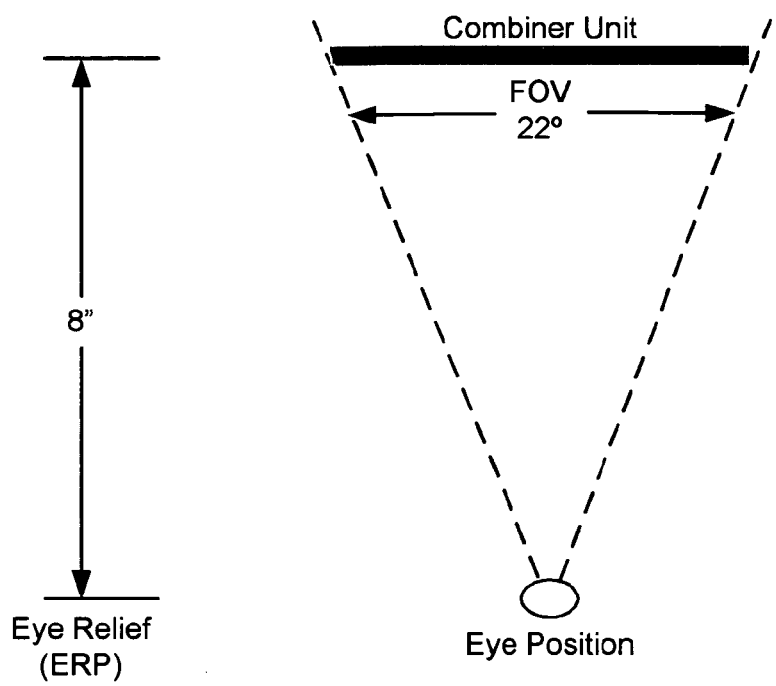
Figure 4B:
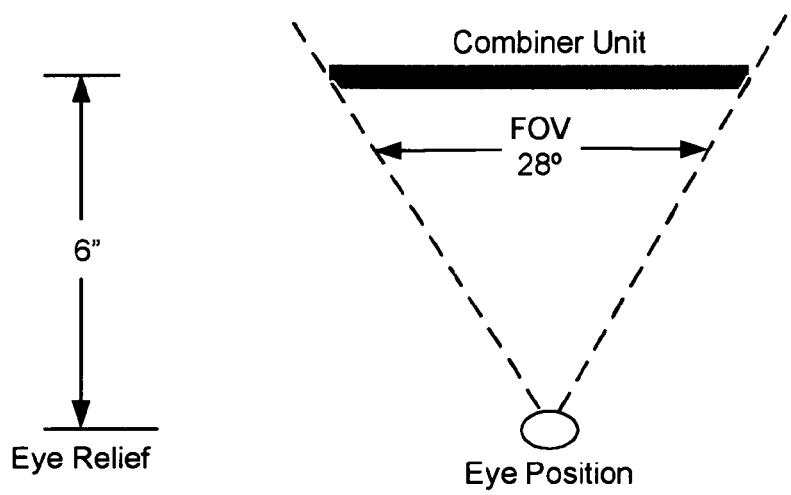

A HUD FOV may be dependent on an aircraft's eye reference position ("ERP") or cockpit design eye position ("DEP"). HUD performance characteristics such as FOV could be measured from the ERP to determine an optimal viewing within a limited area. The drawings of FIG. 4 illustrate this effect. For the sake of illustration in FIG. 4A, an ERP (shown as eye relief) is assumed to be 8", and the FOV for optimal viewing is assumed to be 22°. The FOV of a HUD combiner unit 114 on which images of symbology and/or terrain may be projected. Because a HUD combiner unit 114 has a fixed width (and fixed area), the images may appear to expand or contract within the edges of the combiner unit 114 if the viewer moves his head outside of an optimal viewing area. As shown in FIG. 4B, the viewer has moved his head forward of the ERP to an eye position (shown as eye relief) of 6" for the same combiner unit of FIG. 4A. The forward movement of the eye position has resulted with an increase of FOV to 28° illustrating the effective increase in FOV with a fixed area combiner unit. A change in eye position causes the FOV of the combiner to vary, and an image having a fixed FOV will appear to shrink within the edges of the combiner. In a similar fashion, aft movement of the eye position could result in a decrease in FOV.

Figure 5A:
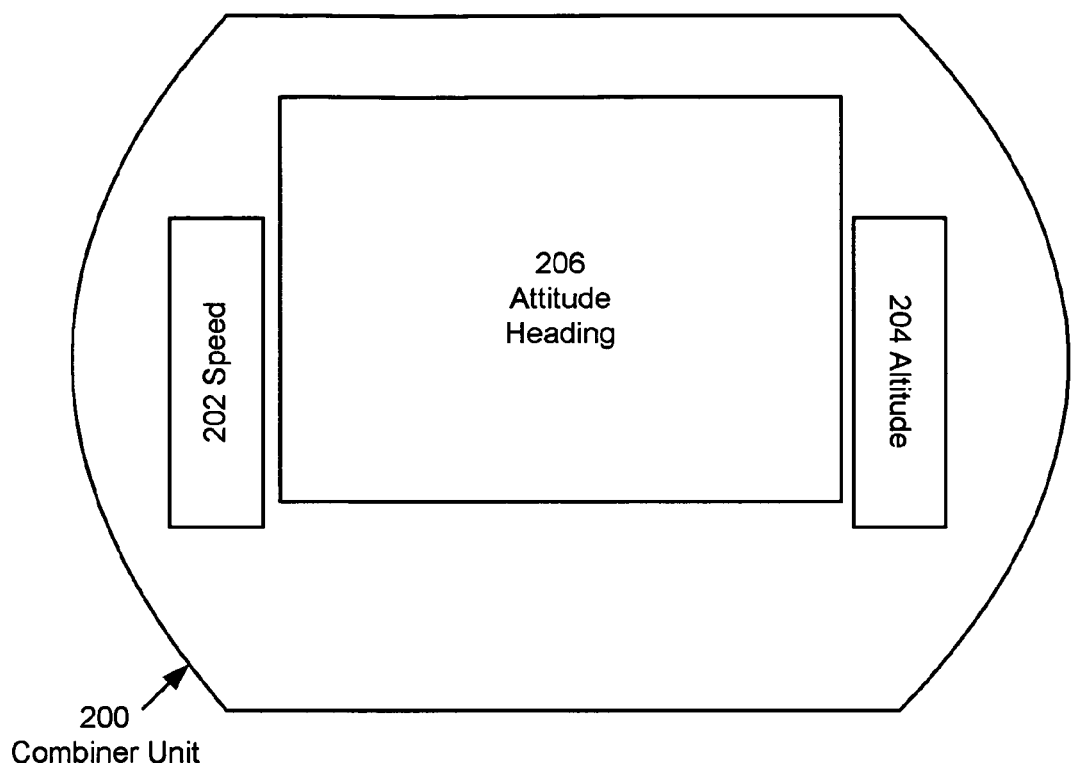

The drawings of FIG. 5 illustrate HUD images attributable to a conformal image of symbology. The illustration of FIG. 5A represents the image if the viewer moved his eye position forward of the ERP. Although a combiner unit 200 has a fixed area, the combiner unit (or edges of the combiner unit) appears to have become larger while the image of flight symbology indicated by the mapped areas speed 202, altitude 204, and attitude/heading 206 remains conformal to the outside scene. In effect, the viewer's forward eye position movement has caused the FOV as seen through the combiner unit to increase, while leaving the conformal flight symbology constrained to the apparent smaller area as defined by the optimal FOV as illustrated in FIG. 3B.

Figure 5B:
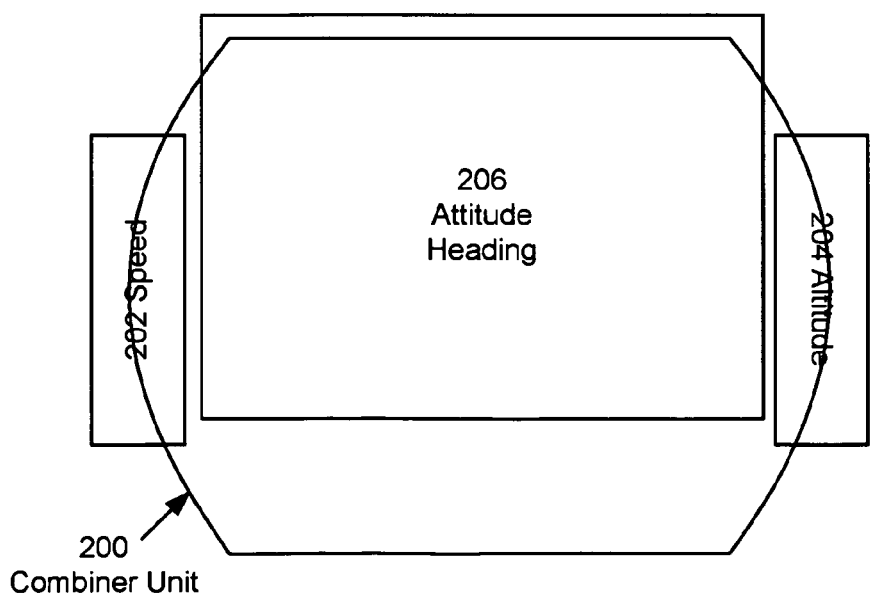

Similarly, the illustration of FIG. 5B represents the image if the viewer moved his eye position aft of the ERP. Although a combiner unit 200 has a fixed area, the combiner unit appears to have become smaller while the image of flight symbology indicated by the mapped areas speed 202, altitude 204, and attitude/heading 206 remain the same size. In effect, the viewer's aft eye position movement has caused the FOV as seen through the combiner unit to decrease, while leaving the conformal flight symbology constrained to the apparent larger area as defined by the optimal FOV as illustrated in FIG. 3B. As demonstrated by the drawings of FIG. 5, conformal information displayed on a combiner unit 114 may be limited to the original HUD FOV.

Figure 6A:
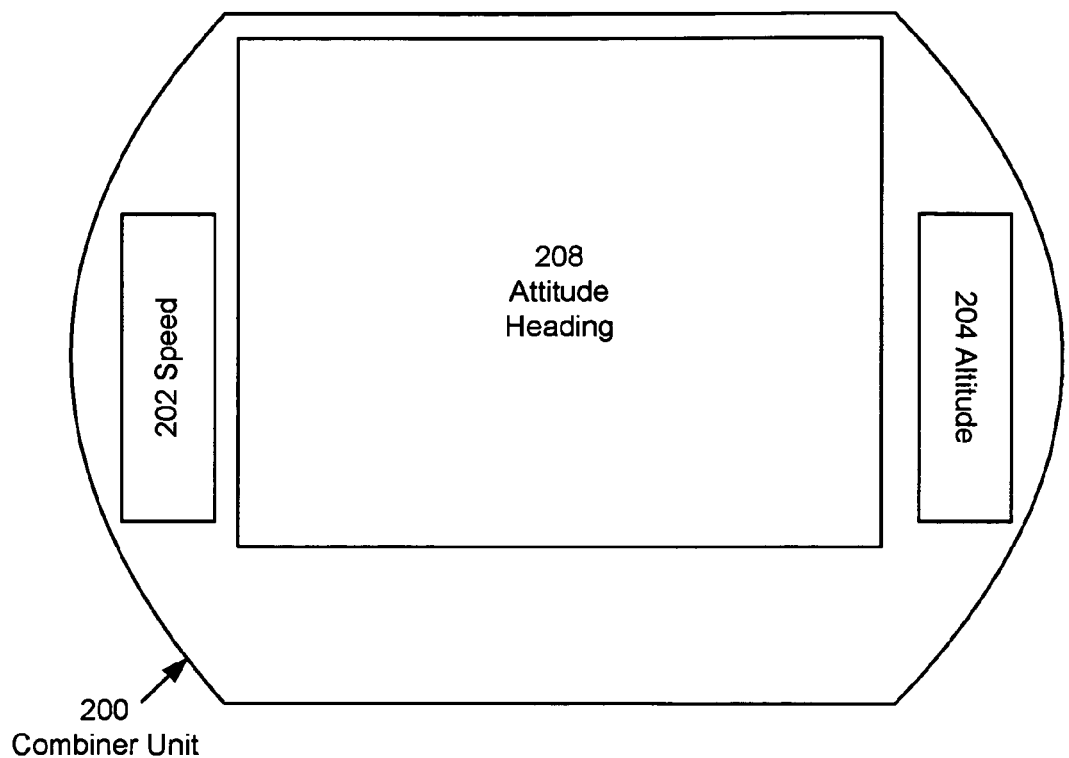
Figure 6B:
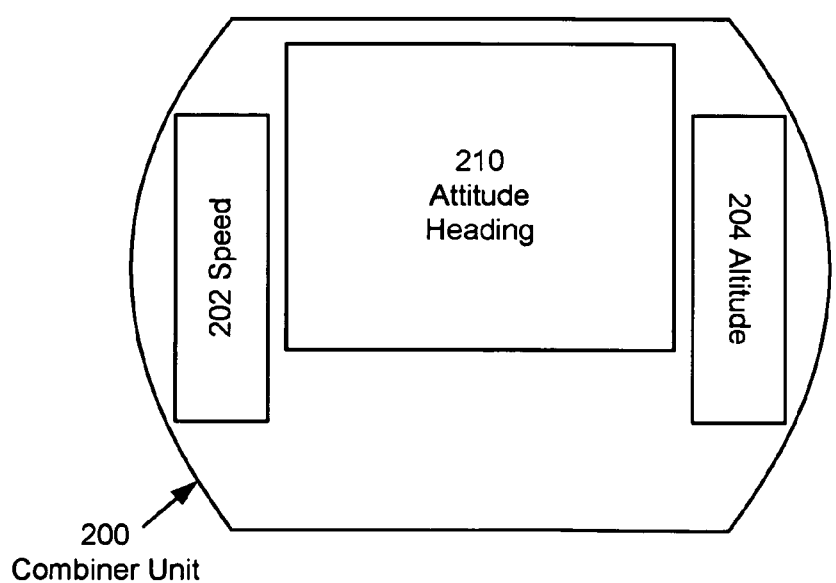

The advantages and benefits of the embodiments disclosed herein provide for an image adaptable to an FOV that increases as the viewer's eye position moves closer or decreases as the viewer's eye position moves aft as illustrated in the drawings of FIG. 6. The illustration of FIG. 6A represents a viewer's eye position forward of the ERP as illustrated by the larger apparent size of a combiner unit 200, and FIG. 6B represents a viewer's eye position aft of the ERP as illustrated by the smaller apparent size of a combiner unit 200 having the same fixed area.

With the presence of a system used in the determination of eye position, the presentation of more information on a combiner unit 114 is possible. An increase to the FOV corresponding to a forward movement of the viewer's eye position could allow for the presentation of more information while retaining the conformal indications of the optimal FOV. For example, the range of some conformal information may be enlarged; as shown in FIG. 6A, the range of the conformal symbology of attitude/heading 208 has been enlarged as indicated by the outwardly increase in both horizontal and vertical directions. Although not shown in FIG. 6A, the enlarged range could apply to the conformal images of the scene outside of the aircraft, where the width and depth of an image of terrain (e.g., synthetic image, enhanced image, etc....) could be enlarged while retaining its conformality, thereby providing the viewer with an expanded view of the outside scene.

In addition to the enlargement of indications, the placement of existing information could be changed or additional information could be displayed with an increase to the FOV. For example, the range of the conformal symbology of speed 202 and altitude 204 of FIG. 6A have not been enlarged, but have been moved outward allowing for more room for the enlarged symbology of attitude/heading 208 indication. Moreover, an increase to the FOV could make room for a plurality of indications or information that may be displayed as symbology as discussed above.

With the presence of a system used in the determination of eye position, the presentation of the same information on a combiner unit is possible in instances, for example, where there is a decrease to the optimal FOV. A decrease to the FOV corresponding to an aft movement of the viewer's eye position could result with the presentation of non-conformal indications of the optimal FOV. For example, the range of some indications may be reduced; as shown in FIG. 6B, the range of the symbology of attitude/heading 210 indications has been reduced as indicated by the inwardly decrease in both horizontal and vertical directions. If the prevention of a loss of the symbology of attitude/heading 210 information is desired, then the conformity may be changed to non-conformal symbology of the optimal FOV. Also, the change in conformity may not apply to all the indications; for example, the range of the conformal symbology of speed 202 and altitude 204 may be retained.

An adaptive FOV function could provide the ability to create a variable FOV image that depends on eye position. An adaptive FOV function could be an algorithm contained in a program where such program could take the form of various programming methods such as, but not limited to, software or firmware. Such function could be configured to receive navigation data (which itself could be represented in navigation symbology) and data associated with eye position to produce conformal or non-conformal symbology, additional or reduced symbology, or both as part of an image data set, where the decision to program the use of such symbology may depend upon a configuration selected by a manufacturer or end-user. Additionally, the function could be configured to produce a conformal terrain image independent of eye position, where the terrain data could be included in an image data set and used to produce a three-dimensional perspective scene outside the vehicle such as, but not limited to, an aircraft.

As embodied herein, data associated with eye position could be eye position data or motion tracking data, where an adaptive FOV function may be appropriately configured to accept the type of data provided to a processor 120. With an input of a plurality of eye positions, an adaptive FOV function could be configured to vary the FOV image correlating to the given eye position. From the examples provided in the discussion above, an adaptive FOV function could produce an FOV image of 22° with an eye relief of 8" and an FOV image of 28° with an eye relief of 6".

FIG. 7 depicts a flowchart 300 of an example of a method for creating a variable FOV image presented on a HUD combiner unit. The flowchart begins with module 302 with the receiving of navigation system data 130 by a processor 120. In one embodiment, data from a navigation system could include, but are not limited to, data representative of speed, altitude, attitude, and heading which may be displayed as symbology on a HUD combiner unit 114. As discussed above, a navigation system 130 could provide data representative of, but not limited to, geographic position, altitude, pitch and roll attitude, speed, vertical speed, heading, and radio altitude.

The flowchart continues with module 304 with the receiving of eye position data 150 by a processor 120. Eye position data 150 may be input data associated with a viewer's eye position. In one embodiment, data associated with eye position could be provided to a processor 120. In another embodiment, data associated with eye position could comprise motion tracking data, where such motion tracking data could be provided directly or indirectly to an appropriately programmed processor 120.

In an alternative embodiment, terrain data 140 may be received by a processor 120. As embodied herein, a terrain data source for providing terrain data could include, but is not limited to, a terrain database, a non-database terrain acquisition system, or any combination thereof. A terrain data source could include terrain data, obstacle data, or both.

The flowchart continues to module 306 with the generation of a variable FOV image data set, where such image data set could represent navigation symbology depicted on a combining unit 114. An adaptive FOV function could be used in the generation of variable FOV image correlating to eye position, where such function could be made part of an algorithm contained in a program. As embodied herein, such program could be configured to accept navigation data and eye position data, where eye position data may be data representative of eye position or motion tracking data. As embodied herein, such program could be configured by a manufacturer or end-user to produce conformal data, non-conformal data, or both. In an alternative embodiment, the image data set could include data representative of a conformal, three-dimensional perspective of a scene outside the aircraft independent of eye position, wherein such data may be determined using terrain data 140 corresponding to navigation system data 130.

The flowchart continues to module 308 with the providing of variable FOV image data set to a HUD system 110 for presentation of an image represented in the image data set of a combiner unit 114, whereby the image FOV correlates to eye position. In one embodiment, the image represented in the image data set could be an image of navigation symbology. In another embodiment, the image represented in the image data set could be an image of a three-dimensional terrain perspective scene outside the vehicle such as, but not limited to, an aircraft. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for creating a variable FOV image presented on a HUD combiner unit, such system comprising:
    a source for providing navigation system data;
    a source for providing data associated with eye position;
    a processor, operatively coupled to receive data, where such processor is configured to
        receive navigation system data;
        receive data associated with eye position of a viewer, where the data associated with eye position correlates to a viewer's FOV with respect to a combiner unit mounted inside a compartment that is occupied by the viewer;
        generate an image data set representative of an image of navigation symbologies representative of the navigation system data, where such image has a variable FOV and is comprised of a plurality of areas to which such navigation symbologies are mapped, such that
            the image data set is generated by applying the navigation system data and the data associated with eye position to an adaptive FOV function, whereby
                the variable FOV of the image and the size of at least one area are increased with an increase to the viewer's FOV, and
                the variable FOV of the image and the size of at least one area are decreased with a decrease to the viewer's FOV, so that
                the visibility of the navigation symbologies is not interrupted when projected onto the combiner unit; and
        provide the image data set to a HUD system; and
    the HUD system, operatively coupled to receive the image data set, wherein such HUD system is configured to
        receive the image data set, and
        project the image represented in the image data set onto the combiner unit of the HUD system.

2. The system of claim 1, wherein the adaptive FOV function is configured to produce conformal symbology, non-conformal symbology, or both.

3. The system of claim 1, wherein the data associated with eye position comprises eye position data or motion tracking data.

4. The system of claim 1, wherein the processor comprises a processor of an aircraft system.

5. The system of claim 4, wherein the aircraft system is a vision system, the HUD system, or a system associated with sensing eye position.

6. The system of claim 1, further comprising:
    a source for providing terrain data, where
    the processor is further configured to receive terrain data, such that
        the terrain data is included in the generation of the image data set, whereby the image represented in the image data set includes a three-dimensional perspective of the scene outside the aircraft.

7. The system of claim 6, wherein the source for providing terrain data includes a terrain database, a non-database terrain acquisition system, or combination of both.

8. The system of claim 6, wherein the adaptive FOV function is configured to produce a conformal three-dimensional perspective of the scene outside the vehicle independent of eye position.

9. A module for creating a variable FOV image presented on a HUD combiner unit, such module comprising:
    an input communications interface to facilitate the receiving of data from at least one data source by a processor;
    the processor, where such processor is configured to
        receive navigation system data;
        receive data associated with eye position of a viewer, where the data associated with eye position correlates to a viewer's FOV with respect to a combiner unit mounted inside a compartment that is occupied by the viewer;
        generate an image data set representative of an image of navigation symbologies representative of the navigation system data, where such image has a variable FOV and is comprised of a plurality of areas to which such navigation symbologies are mapped, such that
            the image data set is generated by applying the navigation system data and the data associated with eye position to an adaptive FOV function, whereby
                the variable FOV of the image and the size of at least one area are increased with an increase to the viewer's FOV, and
                the variable FOV of the image and the size of at least one area are decreased with a decrease to the viewer's FOV, so that
                the visibility of the navigation symbologies is not interrupted when projected onto the combiner unit; and
        provide the image data set to a HUD system; and
    an output communications interface to facilitate the providing of the image data set to the HUD system, whereby the image represented in the image data set is projected onto the combiner unit of the HUD system.

10. The module of claim 9, wherein the adaptive FOV function is configured to produce conformal symbology, non-conformal symbology, or both.

11. The module of claim 9, wherein the data associated with eye position comprises eye position data or motion tracking data.

12. The module of claim 9, wherein the module comprises a module of an aircraft system.

13. The module of claim 12, wherein the aircraft system is a vision system, the HUD system, or a system associated with sensing eye position.

14. The module of claim 9, wherein the processor is further configured to receive terrain data, and such that the terrain data is included in the generation of the image data set, whereby the image represented in the image data set includes a three-dimensional perspective of the scene outside the aircraft.

15. The module of claim 14, wherein the source for providing terrain data includes a terrain database, a non-database terrain acquisition system, or combination of both.

16. The module of claim 14, wherein the adaptive FOV function is configured to produce a conformal three-dimensional perspective of the scene outside the aircraft independent of the eye position.

17. A method for creating a variable FOV image presented on a HUD combiner unit, such method comprising:
performing the following elements, where such elements are performed by an aircraft system processor:
receiving navigation system data from a navigation system;
receiving data associated with eye position of a viewer from a source for providing data associated with eye position, where the data associated with eye position correlates to a viewer's FOV with respect to a combiner unit mounted inside a compartment that is occupied by the viewer;
generating an image data set representative of an image of navigation symbologies representative of the navigation system data, where such image has a variable FOV and is comprised of a plurality of areas to which such navigation symbologies are mapped, such that the image data set is generated by applying the navigation system data and the data associated with eye position to an adaptive FOV function, whereby the variable FOV of the image and the size of at least one area are increased with an increase to the viewer's FOV, and
the variable FOV of the image and the size of at least one area are decreased with a decrease to the viewer's FOV, so that
the visibility of the navigation symbologies is not interrupted when projected onto the combiner unit; and
provide the image data set to a HUD system, whereby the image represented in the image data set is projected onto the combiner unit of the HUD system.

18. The method of claim 17, wherein the adaptive FOV function is configured to produce conformal symbology, non-conformal symbology, or both.

19. The method of claim 17, wherein the data associated with eye position comprises eye position data or motion tracking data.

20. The method of claim 17, further comprising:
receiving terrain data from a terrain data source, such that the terrain data is included in the generation of the image data set, whereby the image represented in the image data set includes a three-dimensional perspective of the scene outside the aircraft.

21. The method of claim 20, wherein the adaptive FOV function is configured to produce a conformal three-dimensional perspective of the scene outside the vehicle independent of the eye position.

* * * * *